(12) United States Patent
Limmer et al.

(10) Patent No.: US 8,884,544 B2
(45) Date of Patent: Nov. 11, 2014

(54) METHOD FOR OPERATING A LAMP AND ELECTRONIC BALLAST

(75) Inventors: Walter Limmer, Munich (DE); Thomas Rossmanith, Munich (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 249 days.

(21) Appl. No.: 13/132,090

(22) PCT Filed: Dec. 4, 2008

(86) PCT No.: PCT/EP2008/066753
§ 371 (c)(1),
(2), (4) Date: Jun. 1, 2011

(87) PCT Pub. No.: WO2010/063322
PCT Pub. Date: Jun. 10, 2010

(65) Prior Publication Data
US 2011/0254463 A1    Oct. 20, 2011

(51) Int. Cl.
*H05B 37/02* (2006.01)
*H05B 41/36* (2006.01)

(52) U.S. Cl.
CPC .......... *H05B 37/0281* (2013.01); *H05B 41/36* (2013.01); *Y02B 21/42* (2013.01)
USPC ........................... 315/291; 315/307; 315/219

(58) Field of Classification Search
USPC ............ 315/291, 225, 226, 106, 209 R, 105, 315/107, 115, 119, 194, 198, 219, 246, 315/307; 323/263, 345
See application file for complete search history.

(56) References Cited

U.S. PATENT DOCUMENTS

| | | | | |
|---|---|---|---|---|
| 4,546,419 A | * | 10/1985 | Johnson | 362/95 |
| 4,682,080 A | * | 7/1987 | Ogawa et al. | 315/209 R |
| 5,557,174 A | * | 9/1996 | Johler | 315/194 |
| 6,201,351 B1 | * | 3/2001 | Rudolph et al. | 315/159 |
| 6,683,800 B2 | | 1/2004 | Loef et al. | |
| 7,369,060 B2 | | 5/2008 | Veskovic et al. | |
| 7,812,544 B2 | * | 10/2010 | Morales et al. | 315/209 R |
| 2001/0002780 A1 | * | 6/2001 | Klien | 315/194 |
| 2002/0097008 A1 | * | 7/2002 | Krummel | 315/291 |
| 2010/0270936 A1 | * | 10/2010 | Dijkstra et al. | 315/219 |
| 2011/0025233 A1 | * | 2/2011 | Morales et al. | 315/307 |

FOREIGN PATENT DOCUMENTS

| | | |
|---|---|---|
| CN | 200958713 Y | 10/2007 |
| CN | 101112126 A | 1/2008 |
| CN | 101227785 A | 7/2008 |
| EP | 1258978 A2 | 11/2002 |
| GB | 2432414 A | 5/2007 |

OTHER PUBLICATIONS

English language abstract of CN 101227785 A dated Jul. 23, 2008.
English language abstract of CN 200958713 Y dated Oct. 10, 2007.

* cited by examiner

*Primary Examiner* — Vibol Tan

(57) ABSTRACT

A method for operating a lamp may include: Connecting a device to a pair of input connections of an electronic ballast and by this means determining a respective dimming duration for at least one predetermined situation; and Activating the lamp by the electronic ballast in at least one predetermined situation such that the lamp emits light with a reduced intensity compared with the normal intensity at which the lamp otherwise emits light over a period of a dimming duration determined for this situation.

13 Claims, 1 Drawing Sheet

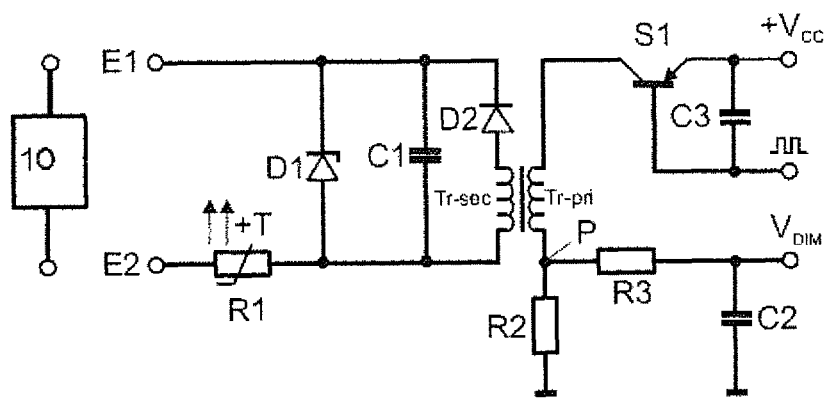

METHOD FOR OPERATING A LAMP AND ELECTRONIC BALLAST

TECHNICAL FIELD

The invention relates to a method for operating a lamp with the aid of electronic ballast. It also relates to an electronic ballast according to the preamble of claim 11.

PRIOR ART

Electronic ballasts according to the preamble of claim 11 are widespread. They have a clock to activate a lamp dependent on a time measured by this clock. Typically the lamp is switched on at nightfall. In the evening the lamp is intended to shine brightly enough to be operated in normal mode. Later in the night the intensity of the light emitted by the lamp can be reduced, the lamp can be dimmed. Currently the period over which the lamp is operated in dimmed mode (e.g. from a certain time) is determined for each electronic ballast, in other words it is programmed invariably. Several versions of the same electronic ballast, which are distinguished by the predetermined dimming duration, are therefore provided for one and the same type of lamp. When connecting an electronic ballast, it must then be determined for each lamp how long the lamp should be dimmed in each case. This is disruptive. The procurement of a number of versions of one and the same electronic ballast is also expensive.

SUMMARY OF THE INVENTION

The task of the present invention is to show a way in which a procurement of a number of different electronic ballasts can be avoided while a choice is still provided concerning the dimming duration.

This task is achieved through a method with the features of claim 1. Furthermore, it is achieved in an electronic ballast with the features of the preamble of claim 11 by the feature of the characterizing clause of claim 11. According to a further aspect of the invention an electronic ballast with features according to claim 12 is provided.

Particularly advantageous embodiments can be found in the dependent claims.

A method according to the invention for operating a lamp includes the following steps:

Connection of a device (see 10 of FIG. 1) to a pair of input connections of an electronic ballast and by this means establishment of a respective dimming duration for at least one predetermined situation, b) Activation of the lamp by the electronic ballast in at least one predetermined situation such that this emits light over a period of a dimming duration determined for this predetermined situation with a reduced intensity compared with the normal intensity at which the lamp otherwise emits light.

By connecting a device to two input connections of the electronic ballast, the dimming duration is notified to the electronic ballast at least indirectly. The dimming duration does not then have to be stored in the electronic ballast in advance. Subsequently it can dim the lamp according to the connected device.

The electronic ballast can otherwise behave like a standard ballast for which a dimming duration is permanently established. Thus, in particular a dimming mode of the lamp can be repeated, in other words, step b) can be repeated after one-off performance of step a). In lamps used in external lights, in particular including in street lights, in particular the lamp is put into operation every evening and switched off again in the morning.

The predetermined situation can be determined by indicating a date. As is known, the duration of the night is dependent on the date. If appropriate, a location where the lamp is installed can also determine the situation.

It is now possible to store a majority of dimming durations in the electronic ballast in advance for each of a majority of situations. By connecting the ballast a general selection is then made for all the situations, e.g. for a particular date a short, medium or long dimming duration can be established. By connecting the ballast, it need only be established whether the short, medium or long dimming duration is to be selected. The established dimming duration is then individually assigned to the respective date.

Thus preferably in step a) a respective dimming duration for a large number of particular days is established, step b) being performed daily on the particular days with consideration being given to the dimming duration established for the respective day. Otherwise it may be established that dimming always starts at a predetermined time. Alternatively, for example, a time can also be established at which each dimming duration is to be cut by half. For a longer dimming duration the procedure of dimming then starts earlier, for a shorter dimming duration later.

There are now several possibilities for how a ballast can provide information by connecting a device.

Electronic ballast frequently has a so-called 1 V to 10 V interface: the electronic ballast then applies voltage to both the input connections. By means of an internal circuit it can detect with predetermined accuracy what kind of device is connected to the input connections. There are two possibilities: a voltage source may be connected. The electronic ballast can detect the voltage applied in this way at least approximately so that by means of the value of the voltage applied in this way at least one dimming duration is established for a predetermined situation. Alternatively, in the case of traditional electronic ballast a resistance element can be connected, wherein the dimming duration for a predetermined situation is established by means of the resistance of this element.

When applying voltage, a dimming duration for a predetermined situation can be derived by means of a mathematical relationship from the value of the applied voltage. In precisely the same way, in the case of an applied resistance element a dimming duration for a predetermined situation can be derived by means of a mathematical relationship from the value of the applied voltage. The use of a mathematical relationship is useful in particular if a certain precision is desired when determining the dimming duration.

It is simpler if the applied voltage or the applied resistance is divided into value margins and at least one dimming duration is assigned to each of such value margins. Then by connecting the voltage source or the resistance at least one dimming duration is established, which is assigned to the interval in which the value of the applied voltage or the applied resistance occurs.

Both when connecting a voltage source and when connecting a resistance element, in addition to at least one dimming duration an additional parameter can be established at the same time. The additional parameter can also be deduced on the basis of a mathematical relationship from the value of the voltage/resistance. However, it is particularly easy if predetermined value margins are used. Such value margins can then be assigned to both at least one dimming duration and one additional parameter. Several value margins can be assigned to the same dimming duration insofar as the assigned additional parameters are distinguished from each other. By applying a voltage or a resistance which occurs in such a predetermined value margin, both the dimming duration assigned to this value margin as well as the additional parameter can be determined.

When using a new design of an electronic ballast, in step a) an impedance element which is not a pure resistance element or apart from a resistance element includes an inductive and/or a capacitive element can generally also be connected. As a result of the connection of a complex impedance being enabled in this way, at least two parameters can be determined without further ado because a complex resistance can be defined by two independent items of information. In the simplest case it can be envisaged that the resistance of the resistance element determines at least one initial parameter and the capacitance or inductance of the additional element determines at least a second parameter. The establishment of the first parameter via the resistance can take place in the aforementioned manner via a mathematical relationship or assignment to value margins. As described above, apart from the first parameter an additional (third) parameter can also be established.

As a numerical value can likewise be specified for the capacitance or inductance, here too a mathematical relationship can be derived or value margins can be defined so that at least the second parameter can be determined analogous to at least the first parameter. In particular, apart from a second parameter an additional (fourth) parameter can also be determined by means of the capacitance or inductance.

Altogether it is also possible to determine more than two parameters at once by means of respective elements.

It is possible that step a) includes the impedance element remaining permanently connected for the operating period of the electronic ballast. If necessary, the electronic ballast can then read out the dimming duration again each time. On the other hand, such an impedance element can then be used again if it is only connected in an initialization phase. The same also applies in particular to a voltage source as a connecting device and any other type of device which may be expensively designed.

The electronic ballast provided according to the invention in accordance with claim 11 is characterized in that the dimming duration can be adjusted from outside the electronic ballast and then stored in the electronic ballast. It must be noted that this cannot be equated with activation of the electronic ballast via control commands. Rather the dimming duration only needs to be adjusted once and this can take place long before starting the operation of the lamp or at least before the desired start of the dimming operation.

a) The electronic ballast according to the invention in accordance with claim 12 (see 10 of FIG. 1) has two input connections and a device which is in a position to read out two pieces of information when connected to a predetermined device on the input connections.

An interface accessible in this regard via the two input connections therefore enables more complex determination of an operating status of the electronic ballast than was previously possible. Until now only one piece of information was communicated via such an interface, e.g. a time at which the electronic ballast was to start the dimming operation. This time can be transmitted as the first piece of information and the dimming duration as the second piece of information. In this way the electronic ballast preferably has both the features in accordance with claim 11 as well as in accordance with claim 12.

The possibility of reading out two pieces of information is in particular provided if the input connections are connected to the secondary side of a transformer the primary side of which is connected with means to charge the primary side with an alternating current signal, the frequency of the alternating current being variably adjustable by the electronic ballast. Then a complex impedance can be connected to the input connections and a response determined in the electronic ballast on the primary side. If two pieces of information are read out, it is sufficient to take a measurement of two frequencies.

The recording of a response on the primary side to the connection of an impedance is preferably enabled by the primary side of the transformer being part of a voltage divider circuit to which the means to read out a voltage are connected. If means to evaluate the voltage are then subordinated to the means for read-out, which knows or can be supplied with an item of information about the frequency of the alternating current signal, then these can deduce an item of information from at least one value of a selected voltage and the frequency of the alternating current, if necessary deduce another item of information from another value of a selected voltage at another frequency of the alternating current, if necessary also deduce several items of information from several such measured values at several frequencies.

BRIEF DESCRIPTION OF THE DRAWING(S)

The invention is to be explained in detail on the basis of an exemplary embodiment below. The only FIGURE shows the circuit diagram for a circuit in an electronic ballast in accordance with an embodiment of the invention.

PREFERRED EMBODIMENT OF THE INVENTION

The core of an envisaged circuit configuration in an electronic ballast in accordance with an embodiment of the present invention for the provision of an interface is a transformer with its primary side Tr-pri and its secondary side Tr-sec. The primary-side winding Tr-pri is switched in a series connection between a transistor (switch) S1 and a resistance R2, a potential +Vcc being on the collector of the transistor and the resistance R2 being connected with mass to its input opposite the winding Tr-pri. The base of the transistor S1 is connected to a pulse generator. The pulse generator is connected to the potential input via a condenser C3, in other words the base of the transistor S1 with its collector. The pulse generator brings about the charging of the winding Tr-Pri with an alternating current. On the secondary side of the transformer, in other words in the winding Tr-sec, this alternating current ensures the fall-off of an alternating current which is rectified via a diode D2 so that direct voltage falls off at inputs E1 and E2. The extent of this direct voltage is limited by a Zener diode D1, a resistance R1 likewise tunes the voltage falling off at inputs E1 and E2. Flattening takes place on account of a condenser C1 switched between inputs E1 and E2.

The voltage falling off at the inputs E1 and E2 is dependent on a load connected to it. This load can be a complex resistance (impedance), e.g. include a resistance and a condenser at the same time. The potential at point P between the primary-side winding Tr-pri and the resistance R2, in other words at point P, is determined by the load. If a series circuit from a resistance R3 and a condenser C2 is switched in parallel to the resistance R2, a flattened direct voltage $V_{DiM}$ can be measured between the resistance R3 and the condenser C2. This direct voltage $V_{DiM}$ is dependent on the impedance at the inputs E1 and E2. In the case of a complex impedance, at the same time it is dependent on the frequency of the alternating rhythm of pulsations produced by the pulse generator on the basis of the transistor S1. Here this frequency should be variable. Then during connection of a complex impedance a majority of measurement values can be ascertained, a measurement value for each frequency. Ultimately an adjacent impedance can be calculated from these measurements. However, it can be estimated at least roughly what resistance a resistance element has to the impedance and what capacitance a condenser has to the impedance. The rough estimate can be made as an assignment to value margins. If information is now established for such value margins, at present two such items of information can be determined, namely, for example, via the resistance element on the one hand and the capacitance element on the other, which is connected to the connections E1 and E2. The variability of the frequency of the pulses emitted by the pulse generator to the base of the transistor S1 therefore enables more than just one item of information to be read out via an interface formed in this way.

One item of information can determine the start of a dimming operation, another item of information the dimming duration.

In a modification it is possible to determine more than just one parameter for individual value margins. If the impedance can be precisely measured on account of the variability of the frequency of the pulses emitted by the pulse generator, very small value margins can be produced. Then an initial value margin can, for example, be assigned to the dimming start 1 and the dimming duration 1, the dimming start 1 and the dimming start 2 to a second value margin, the dimming start 2 and the dimming duration 1 to a third value margin and the dimming start 2 and the dimming duration 2 to a fourth value margin. If it is possible to precisely ascertain in which value margin the respective value is, two parameters are determined in this way. This can be increased to any desired number of parameters if the value margins grow constantly smaller.

At least two items of information, and possibly even more than two items of information can therefore be transmitted to an electronic ballast with an interface via the connections E1 and E2 and the circuit configuration shown in the FIGURE just by connecting an impedance to the connections E1 and E2. The electronic ballast can in particular call up a dimming duration and in later operation, if the impedance in particular is separated from the interface again, activate a lamp such that it is dimmed beyond the previously determined dimming duration.

The invention claimed is:

1. A method for operating a lamp, the method comprising:
  a) connecting a device to a pair of input connections of an electronic ballast and by this means determining a respective dimming duration for at least one predetermined situation; and
  b) activating the lamp by the electronic ballast in the at least one predetermined situation such that the lamp emits light with a reduced intensity compared with the normal intensity at which the lamp otherwise emits light over a period of a dimming duration determined for this situation,
  wherein in a) a voltage source is connected and by means of the value of the voltage applied in this way at least one dimming duration is determined for a predetermined situation.

2. The method as claimed in claim 1, wherein b) is performed repeatedly after once performing a).

3. The method as claimed in claim 2, wherein in a) a respective dimming duration is determined for a large number of particular days and b) is performed daily on the particular days with consideration being given to the dimming duration determined for the respective day.

4. The method as claimed in claim 1, wherein a dimming duration for a predetermined situation is derived from the value of the applied voltage by means of a mathematical relationship.

5. The method as claimed in claim 1, wherein at least one dimming duration is assigned to the electronic ballast at value margins for the applied voltage and thus by means of the connection of the voltage source at least one dimming duration is determined, which is assigned to the value margin in which the value of the applied voltage occurs.

6. The method as claimed in claim 1, wherein by connecting the voltage source apart from at least one dimming duration an additional parameter is determined.

7. The method as claimed in claim 5, wherein by connecting the voltage source apart from at least one dimming duration an additional parameter is determined wherein in the electronic ballast at predetermined value margins both at least one dimming duration and one additional parameter is assigned and thus by means of the application of a voltage which occurs in such a predetermined value margin both the at least one dimming duration and the additional parameter assigned to this predetermined value margin is determined.

8. The method as claimed in claim 1, wherein in a) an impedance element is connected.

9. The method as claimed in claim 8, wherein in addition to a resistance element at least one of an inductive and a capacitive element is connected, wherein the resistance of the resistance element determines at least one initial parameter and the capacitance or inductance of the capacitive or inductive element determines at least a second parameter.

10. An electronic ballast, comprising:
  a clock which is designed to activate a lamp as a function of a time measured with the clock and hereby in at least one situation to effect an emission of light by the lamp with a reduced intensity compared with a normal intensity with which the lamp otherwise emits light over a period of at least one dimming duration,
  wherein the electronic ballast is configured such that the dimming duration is adjustable from outside the electronic ballast and is configured to then be stored in the electronic ballast,
  wherein by means of the value of the voltage applied from a voltage source connected to the electronic ballast the at least one dimming duration is determined for a predetermined situation.

11. An electronic ballast, comprising:
  a clock which is designed to activate a lamp as a function of a time measured using the clock and hereby in at least one situation to effect an emission of light by the lamp with a reduced intensity compared with a normal intensity with which the lamp otherwise emits lights over a period of a dimming duration;
  two input connections; and
  a device which is in a position to read out two items of information when a predetermined device is connected to the input connections, wherein by means of a value of a voltage applied by the predetermined device at least one dimming duration is determined for a predetermined situation.

12. The electronic ballast as claimed in claim 1, wherein the input connections are connected to the secondary side of a transformer the primary side of which is connected to means to charge the primary side with an alternating current signal, the frequency of the alternating current being variably adjustable.

13. The electronic ballast as claimed in claim 12, wherein the primary side of the transformer is part of a voltage divider circuit to which means to read out a voltage are connected, wherein the means for evaluation are subordinated to the means for read-out and are designed to deduce information from at least one value of a read-out voltage and if necessary the frequency of the alternating current.

* * * * *